J. C. HOLLANDS.
HANDLE MECHANISM FOR COOKING UTENSILS.
APPLICATION FILED JAN. 10, 1908.
905,429.
Patented Dec. 1, 1908.
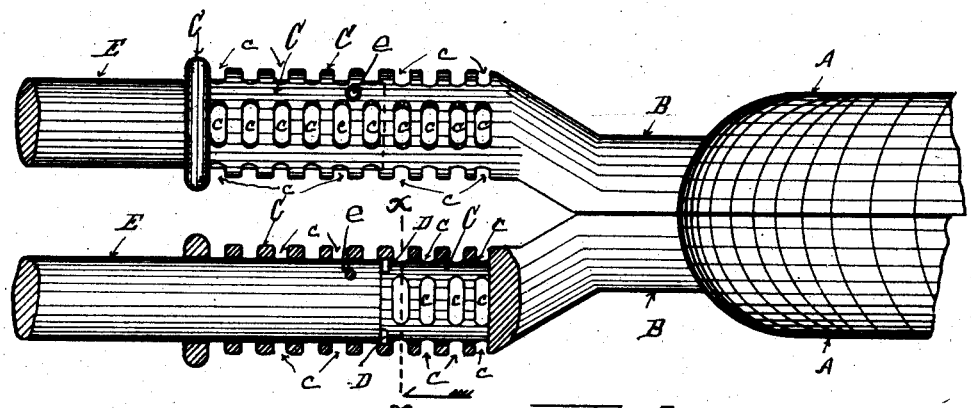
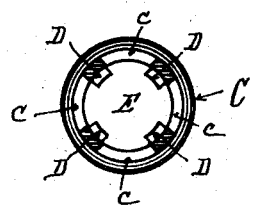
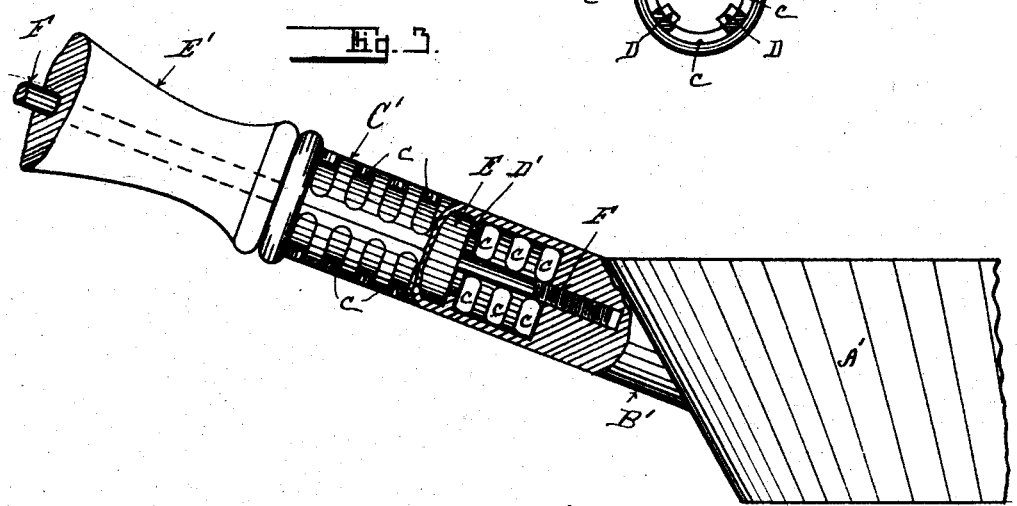
Witnesses.
Inventor.
John C. Hollands

UNITED STATES PATENT OFFICE.

JOHN C. HOLLANDS, OF ERIE, PENNSYLVANIA.

HANDLE MECHANISM FOR COOKING UTENSILS.

No. 905,429.         Specification of Letters Patent.       Patented Dec. 1, 1908.

Application filed January 10, 1908.  Serial No. 410,146.

*To all whom it may concern:*

Be it known that I, JOHN C. HOLLANDS, a citizen of the United States, residing at Erie, in the county of Erie and State of Pennsylvania, have invented certain new and useful Improvements in Handle Mechanism for Cooking Utensils; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in handle mechanism for cooking utensils.

Heretofore in the construction of waffle-irons, skillets, and other cooking utensils, which in use are subjected to considerable heat, various means have been utilized to secure handles thereto which would not become too hot to handle, among which means, closed sockets have been cast upon such utensils and handles secured therein. The heat, however, acting upon such closed sockets soon burned or charred the portion of the handle inserted therein so that it became loose and useless.

The object of this invention is to overcome the difficulty of securing wooden handles to such utensils so that they will be lasting and serviceable. To accomplish this result we make a handle-socket on the utensil having radial openings therein, and insert the wooden handle into this skeleton socket about one half or two thirds of the length of the socket, leaving a portion of the skeleton socket between the end of the wooden handle and the utensil unoccupied by the handle so inserted therein, so that the air will circulate freely therethrough and also through the openings in that part of the socket surrounding the handle, and prevent the socket becoming so heated as to injure the wooden handle therein.

The features of this invention are hereinafter set forth and explained, and illustrated in the accompanying drawings, in which:

Figure 1 shows a section of a waffle-iron embodying my improved handle mechanism. Fig. 2 shows a transverse section of one of the handles on the line *x—x* looking in the direction of the arrow, in Fig. 1. Fig. 3 shows a section of a skillet embodying my invention with a modification of the means for securing the handle in the socket.

In these drawings illustrating my invention, in Fig. 1, A A are sections of a waffle-iron, and B B projections thereon for handle-sockets C C. These handle-sockets are preferably cast integral with the sections of the waffle-iron, and are provided with a series of radial perforations or openings *c* through the shells of the sockets, so as to practically form skeleton handle-sockets. These skeleton-sockets, are also preferably provided with internally projecting lugs D, as illustrated in Figs. 1 and 2, to limit the distance the wooden handles E can be inserted into the sockets C, so as to leave a portion of the socket C between the inner end of the wooden handle E and the outer end of the handle projection B, open, as is clearly shown in Fig. 1, so that the air will circulate freely through the openings *c*, while at the same time air is admitted through the openings in the socket to the surface of the portion of the handle inserted therein. The handles E E are preferably secured in place by means of pins *e* inserted through holes in the socket C, as shown in Fig. 1.

The skeleton socket C' on the skillet A', is secured to a handle extension B' and is provided with an internal collar D' instead of the internal lugs D, shown in Figs. 1 and 2, and in this case the wooden handle E' is secured in the socket by means of a longitudinal rod F extending therethrough and tapped into the handle extension B'. In all other respects this handle mechanism is the same in construction and operation as that shown in Figs. 1 and 2, and hereinbefore described.

I have hereinbefore described the handles E and E' as made of wood. It is however manifest that these handles may be made of other suitable material as well as of wood, as the feature of a socket having radial openings therein substantially as hereinbefore shown and described, with suitable handles inserted therein only a portion of the length of the skeleton sockets, is the important feature of my invention.

Having thus described my invention so as to enable others to construct and utilize the same, what I claim as new and desire to secure by Letters-Patent is:

1. In a handle mechanism, the combination of a handle socket having radial perforations or openings therein, substantially throughout its entire length, and a handle inserted into said socket a less distance than the length of said socket, whereby air is admitted through said radial openings both between the inner ends of the handle and the vessel to which the socket is attached and to the sides of that portion of the handle inserted in said socket whereby the heat is diffused, substantially as set forth.

2. In a handle mechanism the combination of a handle socket having radial perforations therein substantially throughout its entire length, internal projections in said socket intermediate of its length, and a handle inserted into said socket with its inner end abutting against the internal projections in said socket, whereby air is admitted through said radial openings both between the inner end of the handle and the vessel to which the socket is attached and to the sides of that portion of the handle inserted in said socket, and the heat diffused thereby, substantially as set forth.

In testimony whereof I affix my signature, in presence of two witnesses.

JOHN C. HOLLANDS.

Witnesses:
P. V. GIFFORD,
G. J. MEAD.